US006317012B1

United States Patent
Coffey

(10) Patent No.: US 6,317,012 B1
(45) Date of Patent: Nov. 13, 2001

(54) METHOD AND APPARATUS FOR DISTRIBUTION OF POWER IN A MEDIA CONVERTER SYSTEM

(75) Inventor: Joseph Coffey, Burnsville, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/636,121

(22) Filed: Aug. 10, 2000

(51) Int. Cl.[7] .................................................... H03H 5/00
(52) U.S. Cl. ........................ 333/24 R; 375/219; 375/220
(58) Field of Search ................................... 375/258, 219, 375/220, 377; 333/124, 24 R, 32; 370/463, 466, 538

(56) References Cited

U.S. PATENT DOCUMENTS 5,799,040 * 8/1998 Lau ........................................ 375/377
5,896,417 * 4/1999 Lau ........................................ 375/258

* cited by examiner

Primary Examiner—Shawn Riley
(74) Attorney, Agent, or Firm—Merchant & Gould

(57) ABSTRACT

A method and apparatus are disclosed for distributing power in a media converter system. The method involves converting an input voltage to an intermediate voltage and transmitting the intermediate voltage to a downstream converter. The downstream converter converts the intermediate voltage to a usable output voltage that is supplied to the media converter ports. The apparatus includes a main power supply for creating the intermediate voltage and downstream converters located remotely from the main power supply for converting the intermediate voltage to the usable output voltage. Transmission cables are also included for providing the intermediate voltage to the downstream converters. The apparatus may also include a bus with connections for the power supply and a power distribution module. The power supply and power distribution module utilize identical connections thereby providing flexibility in positioning the power supply and distribution module in a chassis.

27 Claims, 7 Drawing Sheets

METHOD AND APPARATUS FOR DISTRIBUTION OF POWER IN A MEDIA CONVERTER SYSTEM

TECHNICAL FIELD

The present invention relates to the distribution of electrical power from power supplies to downstream devices. More specifically, the present invention relates to the distribution of electrical power in media converter systems.

BACKGROUND

Media converter systems are used in data networks to convert signal transmission from one media, such as twisted pair copper, to another media such as fiber optics. Media converter systems include a power supply and one or more media converters. The media converter performs the conversion of signal transmission. Media converters receive the data signal through one media and output the data signal through another. The media converter is an active device and requires a supply voltage.

A power supply is used to provide operating voltage to the media converters in a media converter system. As shown in FIG. 1, conventional power distribution systems utilize a centralized power supply. A standard voltage $V_{in}$ is provided to a central power supply 102 at input 104. $V_{in}$ is typically an AC voltage such as the 60 Hz 115 volt (VAC) standard but can be other voltages or even DC. The media converter operates on 5 volts DC (VDC). Therefore, the standard line voltage $V_{in}$ must be converted before being applied to the downstream media converter. The centralized power supply 102 converts $V_{in}$ into a usable voltage and provides several DC outputs 106, 108, and 110 that may be different. The output voltages are fed or bussed to downstream devices such as media converters.

Centralized power distribution systems suffer from several drawbacks. Because $V_{in}$ must be converted to the usable voltage before transmission, the current supplied from the power supply through the transmission lines is the total current consumption used by all of the downstream devices which is inefficient because of $I^2R$ losses. The transmission lines must be selected so that the maximum current rating is not exceeded, and this leads to a lack of system flexibility.

Also, governmental certification requirements require that the downstream devices be at or below a certain voltage to be classified as a low voltage device not subject to UL/CSA safety testing. Avoiding a non-low voltage rating allows the device to be much cheaper. If the device is configured to operate at a relatively high voltage that allows low current transmission, the device may not be classifiable as a low voltage device and will become more expensive as a result.

Also, because $V_{in}$ is converted directly to the usable voltage by the centralized power supply, if downstream devices require differing voltages, then the centralized power supply must have multiple outputs supplying the differing voltages as shown in FIG. 1. Power supply complexity is increased to provide the differing voltages, and flexibility of the system is decreased because downstream devices requiring voltages other than that provided by the power supply cannot be easily added.

If many devices are linked to the centralized power supply and its current sourcing limits have been reached, redundancy cannot be added to provide a greater current sourcing limit without adding another centralized power supply and routing its outputs to some of the downstream devices previously linked to the initial power supply. This inability to be made redundant also poses a problem when the initial power supply fails. Because there is no redundancy, no back up power is available to instantaneously handle the current demand previously addressed by the initial power supply.

Furthermore, in some centralized power supply systems, the centralized power supply outputs an AC voltage or the AC line voltage is simply distributed to power supplies at the downstream devices. In systems where the informational signals must be transmitted in proximity to the power transmission lines, the AC voltage in the transmission lines may introduce unwanted characteristics into the informational signal. Therefore, in such centralized power supply systems, the transmission lines must be isolated from the informational signals.

SUMMARY

The present invention addresses issues including the problems discussed above by providing a distributed power supply architecture to provide a usable voltage to downstream media converters. The input voltage is converted to at least one intermediate voltage for transmission. The intermediate voltage is then converted to the usable voltage for the media converter. The intermediate voltage allows the current in the transmission line to be reduced relative to the current that is drawn by the media converters. The intermediate voltage can also be supplied at a value below the low voltage device threshold. The intermediate voltage is preferably DC, thereby allowing informational signals to be transmitted in close proximity to the transmission lines without signal interference. Redundant devices for generating the intermediate voltage may be linked through a bus to permit swapping of power supplies during operation and to provide additional current in reserve. The interfaces to the bus may be made to connect to either the power supply or the power distribution module allowing flexible module positioning.

The present invention is embodied in a method for distributing power in a media converter system. The method involves receiving an input voltage into a first converter and converting the input voltage to an intermediate DC voltage. Transferring the intermediate DC voltage to a remotely located second converter and converting the intermediate DC voltage to an output voltage are also performed.

The present invention is also embodied in an apparatus for distributing electrical power in a media converter system. The apparatus includes at least one first converter that converts an input voltage to an intermediate DC voltage. At least one second converter is included to convert the intermediate DC voltage to an output DC voltage, and the second converter(s) are located remotely from the first converter(s). The apparatus also includes at least one electrical conductor electrically linking the first converter(s) to the second converter(s).

DETAILED DESCRIPTION

Figure 1:
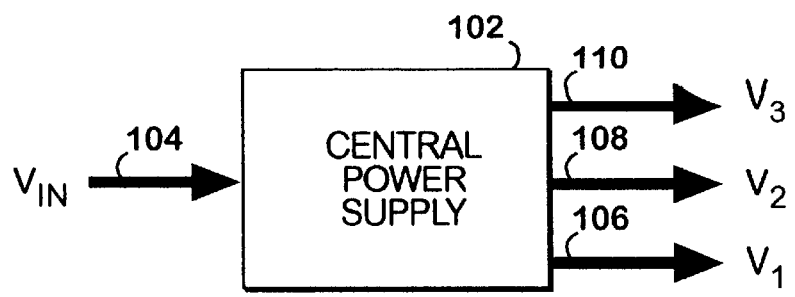
FIG. 1 illustrates a centralized power supply architecture of the prior art.

Various embodiments of the present invention will be described in detail with reference to the drawings, wherein like reference numerals represent like parts and assemblies through the several views. Reference to various embodiments does not limit the scope of the invention, which is limited only by the scope of the claims attached hereto.

The methods and systems described herein implement a distributed power supply architecture for a media converter system. The power supply architecture embodied by methods and systems described herein is applicable to other systems in addition to media converter systems. The distributed power supply architecture involves converting an input voltage to an intermediate voltage which is transmitted. The intermediate voltage is then converted to a usable output voltage that is utilized by a device such as a media converter. The final conversion may be performed by the destination device itself, if the device is equipped with the appropriate electrical components for such conversions.

Figure 2:
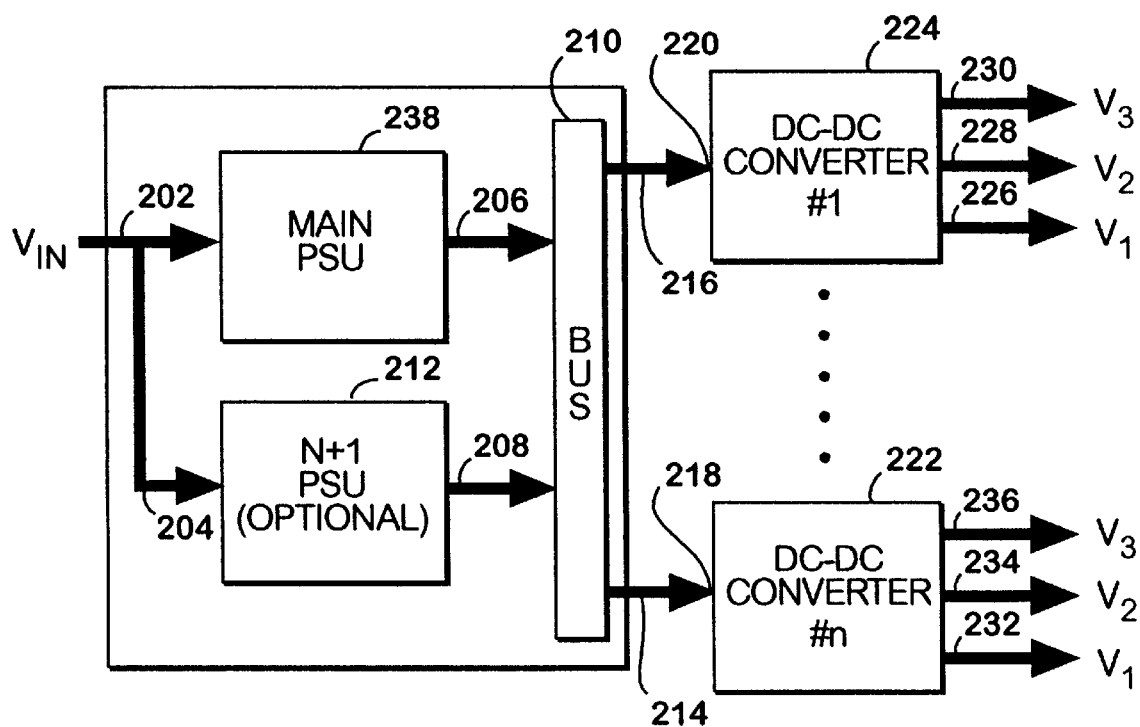
FIG. 2 depicts a distributed power supply architecture in accordance with the present invention.

FIG. 2 shows a basic distributed power supply architecture (DPA). An input voltage $V_{in}$ is provided to a main power supply unit (PSU) 238 at input 202. The main PSU typically accepts AC or DC input voltages and provides one or more regulated output voltages. The regulated output voltages are usually DC. One or more additional PSUs 212 may be included in a DPA. The input voltage $V_{in}$ is provided to the additional PSU at input 204. The main PSU 238 and the optional PSU 212 provide the regulated DC voltage at outputs 206 and 208, respectively. This regulated output voltage acts as an intermediate voltage in the DPA.

The outputs 206 and 208 are electrically linked with a bus 210 which thereby obtains the regulated DC output voltage. This regulated DC bus voltage is output from the bus 210 through a plurality of outputs 214 and 216. The regulated bus voltage is transmitted to downstream inputs 218 and 220 of the one or more DC—DC converters 222 and 224 that convert the intermediate voltage to one or more output voltages 226–230 and 232–236 that are usable by downstream devices (not shown). Because DC—DC converters are not 100% efficient, the power supplied from the main and optional PSUs will be greater than the power actually absorbed by the downstream devices. However, the current in the transmission lines is reduced, redundancy is provided, and the transmission lines carry DC which does not interfere with nearby informational signal lines.

Figure 3:
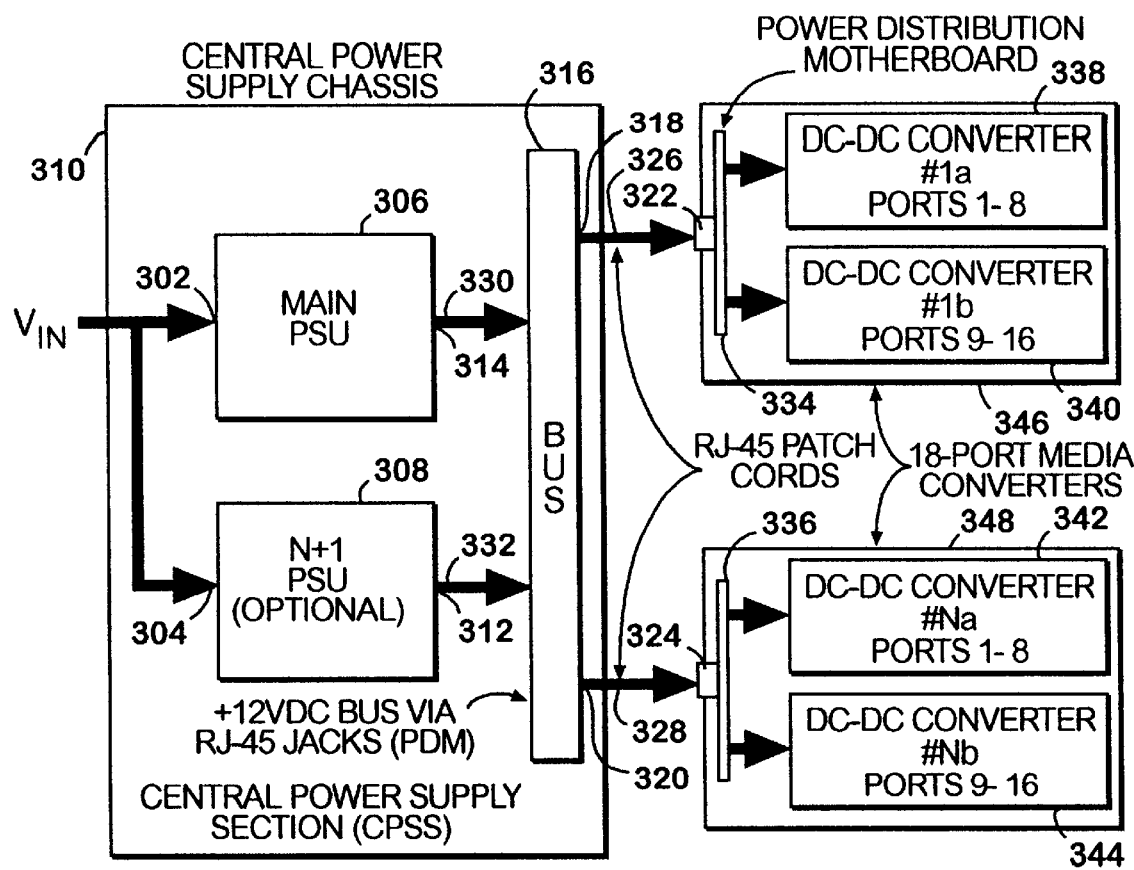
FIG. 3 shows a distributed power supply architecture for a media converter system.

FIG. 3 illustrates the DPA in a media converter system. The input voltage $V_{in}$ is supplied to the main PSU 306 through input 302. An optional PSU 308 for providing redundancy may receive the input voltage through input 304. The main PSU 306 and optional PSU 308 provide a regulated intermediate voltage at outputs 314 and 312, respectively. The intermediate voltage is provided to a bus 316 through connections 330 and 332. In this exemplary embodiment, the connections are several RJ-45 jacks that interface when the main and optional PSUs are installed in a chassis described with reference to FIGS. 6–8. More than one RJ-45 jack per PSU may be used to handle the total current sourced from the PSU. The chassis houses the PSUs and thereby forms a central power supply section (CPSS) 310.

The bus 316 provides the intermediate voltage through outputs 318 and 320. The outputs are typically RJ-45 jacks. Transmission lines 326 and 328 electrically communicate with the outputs 318 and 320. The transmission lines 326 and 328 are typically RJ-45 patch cables. These cables conduct current from the bus 316 to inputs 322 and 324 to power distribution motherboards 334 and 336 of media converters 346 and 348.

The media converters 346 and 348 in this exemplary embodiment contain two sets of eight ports and a DC—DC converter 338–344 for each set of eight ports. The power distribution motherboards 334 and 336 provide the intermediate voltage directly to the DC—DC converters 338–344. The DC—DC converters 338–344 convert the intermediate voltage to an output voltage usable by the media converters to perform media conversion for each port. Rather than embedding the DC—DC converters into the media converters, separate downstream DC—DC converters can be used. Additionally, more than one intermediate voltage could be used in the transfer of power from the PSU to the media converter.

It is desirable to operate the media converters 346 and 348 as low voltage devices to avoid UL/CSA certification which increases the cost of the media converters. To do so, the intermediate voltage should be less than 24 VDC. Typically, the ports operate at 5 VDC. The intermediate voltage may be chosen based upon common output levels for commercially available PSUs. For example, a Compaq modular PCI power supply presents a 12 VDC output. This output is satisfactory because it is below the 24 VDC ceiling. Based upon consideration of the number of ports that must be operated and based upon the maximum current that can be carried by the chosen transmission line, the number of transmission lines may be determined.

As an example, a 10BASE-T/FL media converter port requires approximately 180 mA at 5 VDC. The power dissipation for the media converter port is 900 mW. For a 16 port media converter, 14.4 watts will be used (2880 mA at 5 VDC). Using two 90% efficient DC—DC converters accepting 12 VDC inputs to produce 5 VDC outputs supplying 2880 mA total, the two DC—DC converters require 1333 mA total from the PSUs. Thus, one transmission cable can be used to supply power for the media converter if it has a total current rating of greater than 1333 mA. One RJ-45 cable typically has a current rating of 1500 mA per contact position and can, therefore, be used.

Figure 4:
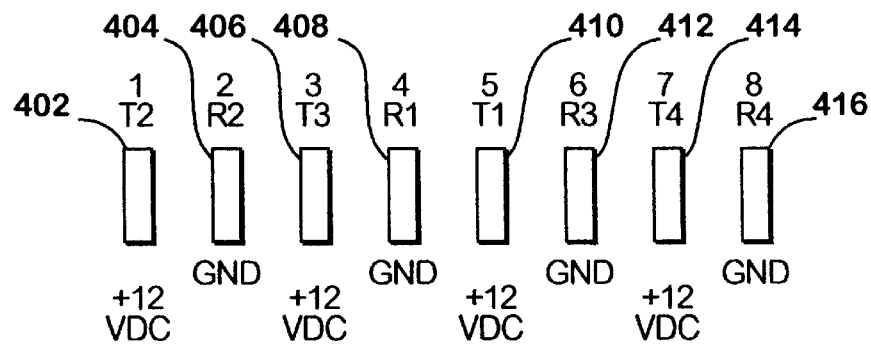
FIG. 4 shows an exemplary bus port and corresponding pin assignments.

FIG. 4 illustrates the bus ports used in the exemplary embodiments described herein. The connections between the PSUs and the bus, and the connections between the transmission cables and the bus and the media converters may all correspond to the same bus port. This exemplary bus port is the RJ-45 standard. The pin assignments are shown for the eight pins contained in the port. The pins in this embodiment alternate between the intermediate voltage and ground. Conductors 402, 406, 410, and 414 (pins 1, 3, 5, and 7) are held at the intermediate voltage. Conductors 404, 408, 412, and 416 (pins 2, 4, 6, and 8) are held at system ground. A variety of RJ-45 jacks known in the art are suitable for the connections.

Figure 5:
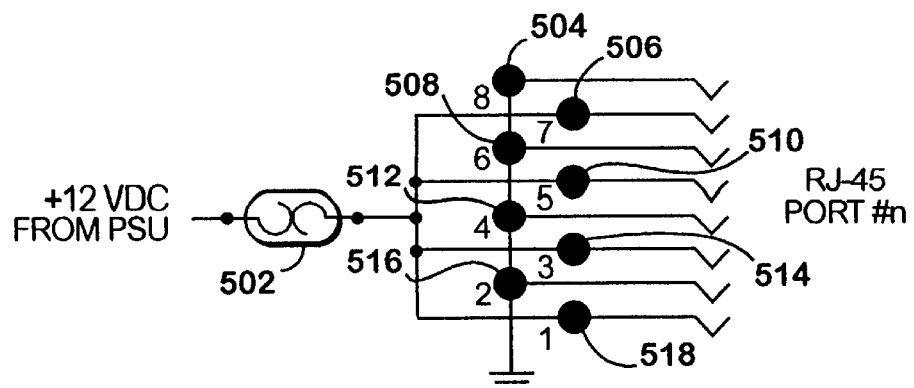
FIG. 5 illustrates a fuse configuration for the exemplary bus port of FIG. 4.

FIG. 5 illustrates an in-line resettable fuse 502 that is used in the exemplary embodiment. The resettable fuse 502 may be placed in the connections between the PSUs and the bus, between the bus and the transmission cables, and/or between the transmission cables and the media converters. The resettable fuse is preferred because it automatically resets once the fault is cleared. The resettable fuse is placed between the incoming current and the intermediate voltage conductors 506, 510, 514, and 518 (pins 1, 3, 5, and 7) of the RJ-45 port. Conductors 504, 508, 512, and 516 (pins 2, 4, 6, and 8) are held at system ground and are not directly connected to the resettable fuse.

Figure 6A:
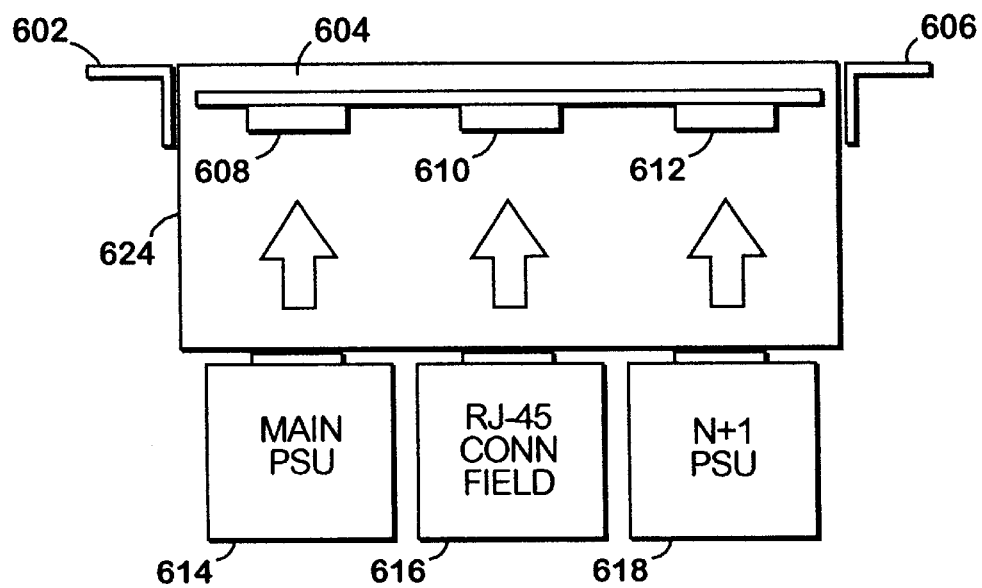
FIG. 6A shows a top view for a distributed power supply architecture in a 1U chassis configuration.

FIG. 6A depicts the DPA using RJ-45 ports that is contained in an IEEE 1U chassis 624. The 1U chassis 624 holds a single row of devices and is mountable in a system rack (not shown). The 1U chassis shown holds two PSUs 614 and 618 and an RJ-45 connector field 616, known as a power distribution module (PDM), forming a single fully redundant CPSS. The DPA includes rack mounts 602 and 606 for attaching the chassis 624 to the system rack. A motherboard 604 known as a backplane is included to establish the system bus. The motherboard 604 has a main PSU RJ-45 connection 608, and optional PSU RJ-45 connection 612, and a connector field RJ-45 connection 616. The main PSU 614, optional PSU 618, and connection field 616 slide into the chassis and plug into the connections 608, 610, and 612. The PSUs 614 and 618 are hot-swappable because of their modular design, and one can be replaced while the other operates because of their redundant configuration.

Figure 6B:
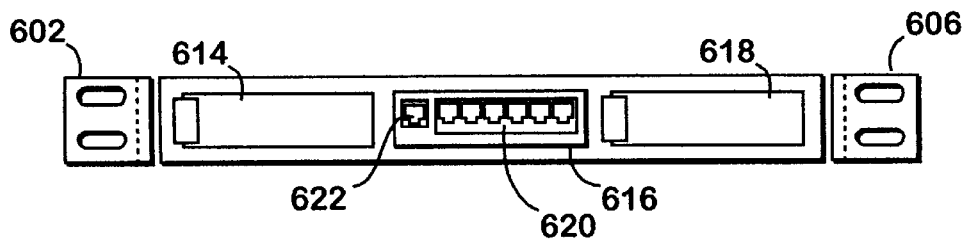
FIG. 6B shows a front view of the distributed power supply architecture of FIG. 6A.

The front view shown in FIG. 6B illustrates the plate of the chassis 624 that is exposed once mounted in the system rack. Rack mounts 602 and 606 are accessible so that the chassis can easily be secured/unsecured from the rack. The main PSU 614 and optional PSU 618 have external connectors (not shown) for $V_{in}$ on the exposed plate. When an AC input voltage is used, the PSUs will typically have an IEC connector. A terminal block (not shown) is provided on the front plate when a DC input voltage is used.

The PDM 616 provides a set of jacks 620 for connection to power transmission cables that ultimately lead to the power converters that supply the usable voltage for the media converter ports. The PDM may also provide an additional jack 622 for connection to an external alarm (not shown). In such a PDM, the PDM contains well-known logic circuitry for determining when a PSU or fan has failed and for providing an alarm signal in response. The alarm signal is transmitted from the alarm jack 622 to the external alarm. When the alarm is triggered, the alarm will signal the system operator who can then determine the problem and correct it.

The 1U chassis may be designed for installation on the rear side of a standard equipment rack. Locating the 1U chassis at the top rear or bottom rear of the rack allows AC input voltage cables to be routed further away from data cables connected to other chassis located in the rack that are dedicated to signal processing and transfer, such as the media converters. This eliminates the intermixing of AC power and data.

Figure 7:
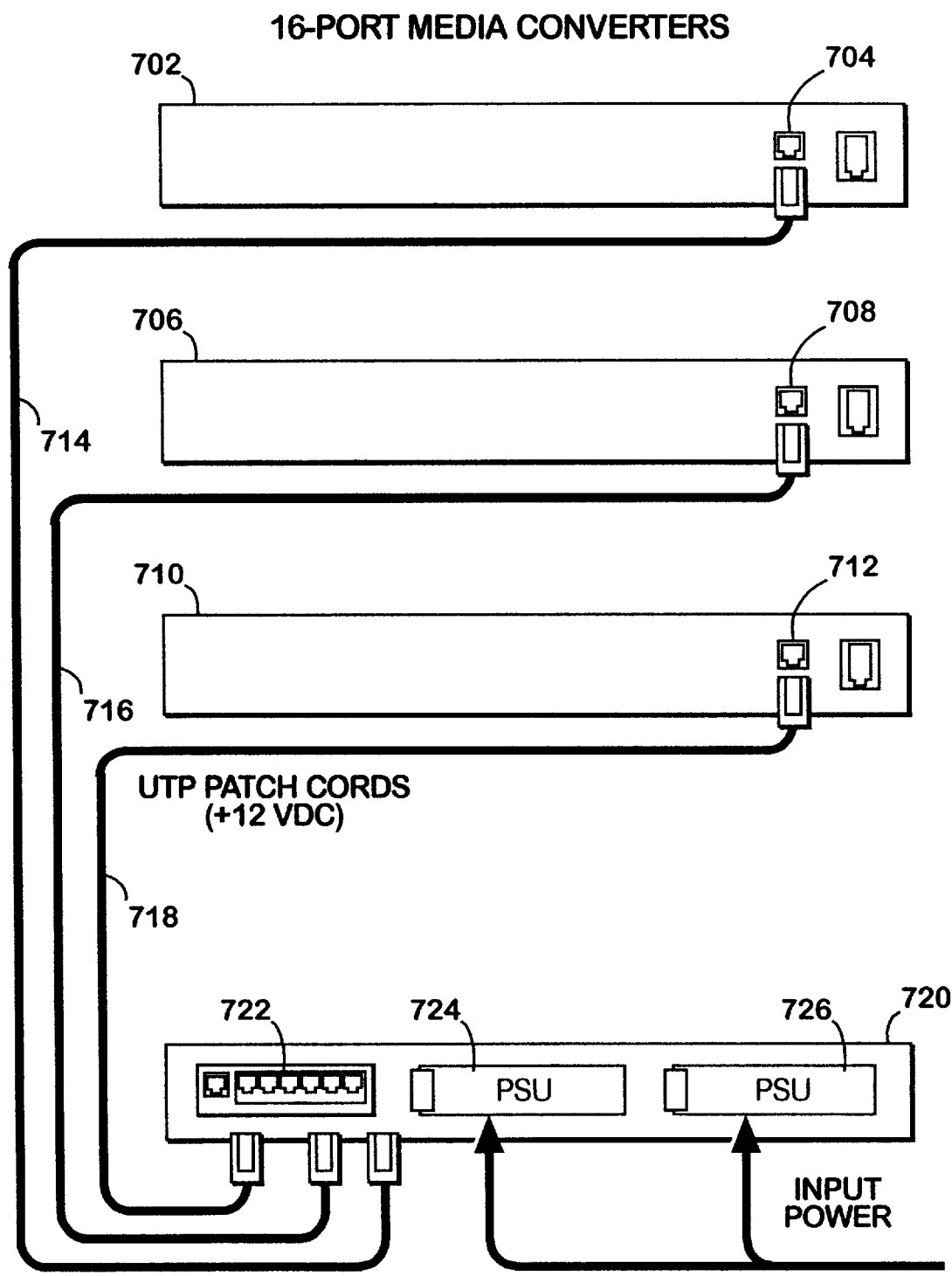
FIG. 7 shows the remote distributed power supply for a 1U chassis configuration with three downstream media converters.

FIG. 7 shows the rear view of a rack with a 1U chassis mounted at the bottom. The input voltage is supplied to the main and optional PSUs 724 and 726 of the CPSS through power cables routed away from data cables. At locations above the CPSS, the 16 port media converters 702, 706, and 710 are mounted in the rack. The media converters have power input jacks 704, 708, and 712. Standard (UTP) patch cables 714, 716, and 718 having RJ-45 jacks are shown. These cables plug into the PDM 722 and transfer power to the power input jacks 704, 708, and 712 at the intermediate voltage.

Alternatively, the PDM could transfer power to a bank of downstream DC—DC converters that supply the power at the usable voltage to the input jacks of media converters lacking embedded DC—DC converters. Another alternative may use multiple intermediate voltages. In an example of that case, the PDM may transfer a first intermediate voltage to a bank of DC—DC converters that supply a second intermediate voltage to the media converters whose DC—DC converters then convert the second intermediate voltage to a usable voltage.

The intermediate voltage cables 714, 716, and 718 are routed away from cables supplying the input power to avoid the introduction of AC characteristics. The intermediate voltage cables 714, 716, and 718 can be routed in proximity to the data cables (not shown) leading into/out of the media converters 702, 706, and 710 because they carry only DC current and will not affect the informational signals. The intermediate voltage cables 714, 716, and 718 transfer power to the jacks 704, 708, and 712 which are connected to each media converter motherboard. The motherboard then distributes the power to the DC—DC converters for conversion to the usable output voltage.

Figure 8A:
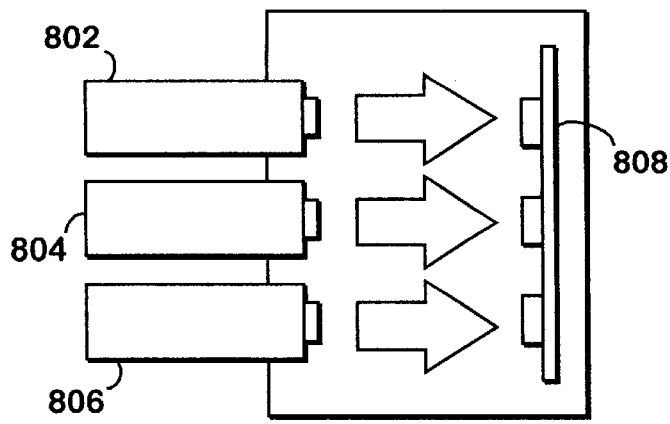
FIG. 8A shows a side view for a distributed power supply in a 3U chassis configuration.

FIG. 8A shows a DPA in an IEEE 3U chassis configuration. The 3U chassis can support 3 fully redundant CPSS. Each component 802, 804, and 806 including a main PSU, optional PSU, and PDM for each CPSS slides into the 3U chassis which provides a backplane 808 to establish the system bus for each CPSS. The backplane 808 has three vertical busses, and each CPSS forms a three row vertical column in this embodiment. Because identical connections are used for all components to the backplane, each component will function correctly regardless of its precise location in the vertical column.

Alternatively, the backplane 808 may provide a bus common to all CPSS in the 3U chassis. In that case, all PDMs can form one column or one row or can be randomly spaced. However, the proper number of PDMs and PSUs must be used to ensure sufficient current reserves and sufficient cable ratings. A suitable backplane connector is the EUROCARD 48 position DIN connector. In either of the alternatives, one or more of the PSUs in the 3U chassis may be hot-swapped without interrupting operation of the power supply system because of the PSU redundancy achieved through using the common bus.

Figure 8B:
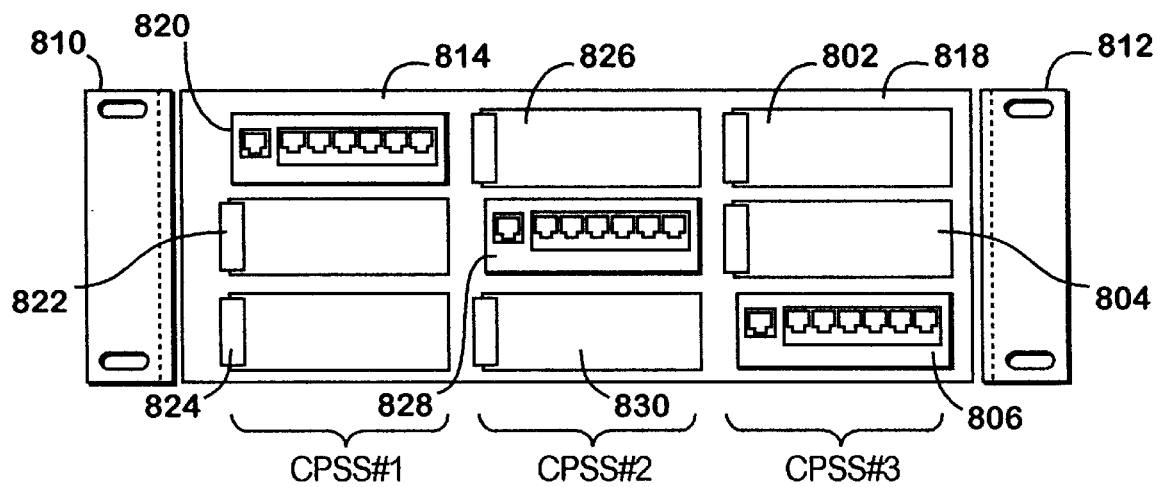
FIG. 8B shows a front view of the distributed power supply architecture of FIG. 8A.

The front view of the 3U chassis in FIG. 8B shows the plate of the chassis that is exposed when mounted in a rack. The rack mounts 810 and 812 allow the chassis to be easily secured/unsecured. Column 814 forms the first CPSS having a PDM 820, a first PSU 822, and a second PSU 824. The second column 816 forms the second CPSS having a PSU 826, a PDM 828, and a PSU 830. The third column 818 forms the third CPSS having PSU 802, PSU 804, and PDM 806 shown in the side view of FIG. 8A. As shown, the PDM for each CPSS has the optional alarm jack. Again, the 3U chassis may be located at the top rear or bottom rear of the rack to avoid intermixing AC power with data from devices mounted in other rack locations.

In both the 1U chassis and the 3U chassis, forced air cooling is desirable. Fans may be included in the rack and operate from the bus voltage supplied by the PSUs. The logic circuitry may be linked to the fans to detect overheating conditions which will also trigger an alarm. Such fans are shown in FIGS. 10 and 11 and are discussed in more detail below with reference to those figures.

Figure 9:
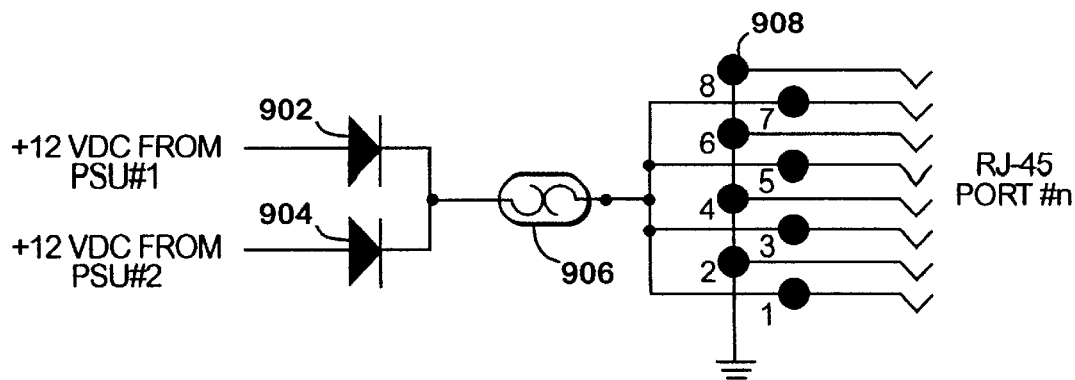
FIG. 9 depicts circuitry for a power distribution module for isolating redundant power supplies.

FIG. 9 shows electrical connections between PSUs and an RJ-45 port 908 of a PDM that allow redundancy where the PSUs were not initially designed for parallel operation. Such power supplies are less expensive and may not be modular. These PSUs can be used for non-hot-swappable configurations where the PSUs are permanent fixtures within the chassis board.

In these configurations, Schottky barrier diodes 902 and 904 are placed between the power supplies and the resettable fuse 906. The Schottky barrier diodes 902 and 904 are provided in an OR-ing configuration to isolate one PSU from the other when a PSU fails. Isolating the failed PSU allows all of the current from the operational PSU to be provided through the RJ-45 ports.

As shown, the diodes are used on a per RJ-45 port basis. This setup is desirable because using a pair of diodes for each RJ-45 port allows use of lower wattage diodes and requires no additional heat sinking. When the PSUs are not modular and are hardwired to the PDM, there may be no additional backplane forming a bus and the barrier diodes may be placed within the circuitry connecting the PSUs to the PDM or within the PDM's internal connection circuitry. However, if a PSU is modular but is not designed for parallel operation, Schottky barrier diodes can be placed within the PSU's connections to the backplane. Schottky barrier diodes are preferred because of their low forward voltage drop.

Figure 10A:
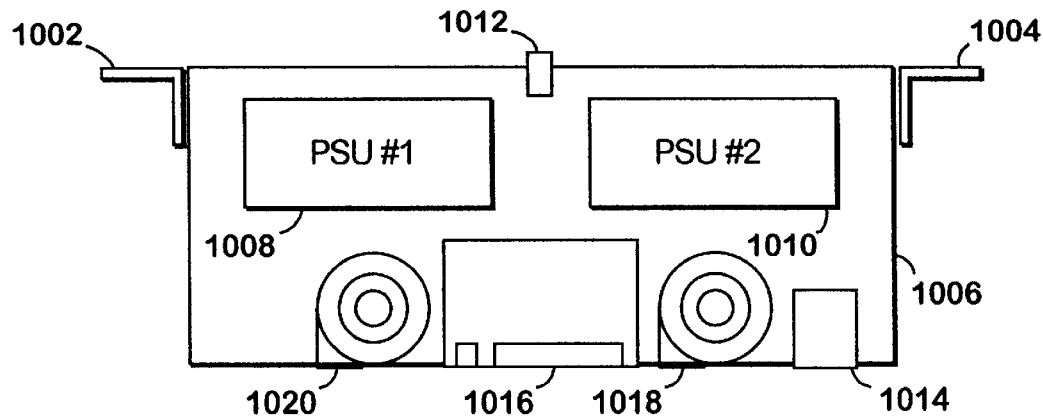
FIG. 10A illustrates a top view of a distributed power supply architecture for a 1U chassis configuration including non-swappable power supply units, power distribution module, and fans.

A 1U chassis 1006 with non-modular PSUs is shown in FIG. 10A. The chassis 1006 has mounts 1002 and 1004 for securing/unsecuring the chassis 1006 to the equipment rack (not shown). The chassis 1006 has non-modular PSUs 1008 and 1010. These non-modular PSUs are hard-wired to the PDM 1016. The chassis 1006 acts as a heatsink for the PSUs 1008 and 1010

In this embodiment, two fans 1018 and 1020 are situated between the front edge of the chassis 1006 and each PSU 1008 and 1010. The fans 1018 and 1020 circulate air to and from outside the equipment rack to cool the PSUs 1008 and 1010 and chassis 1006 during operation. These fans receive power directly from the outputs of PSUs 1008 and 1010. An IEC connector 1014 is provided to receive the AC input voltage and supply it directly to the PSUs 1008 and 1010.

Figure 10B:
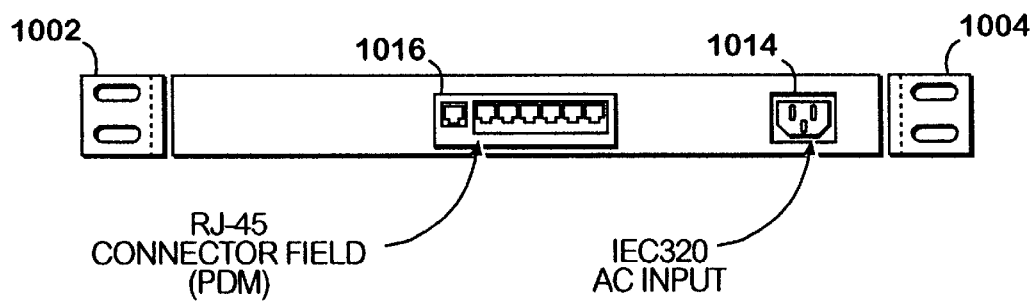
FIG. 10B shows a front view of the distributed power supply architecture of FIG. 10A.

The front view in FIG. 10B shows the plate of the chassis 1006 that is exposed when the chassis is mounted in the rack. The mounts 1002 and 1004 are accessible to enable the chassis to be easily secured/unsecured. The IEC AC input connector 1014 and RJ-45 connector field of the PDM 1016 are exposed on the plate making external power connections easy. As shown, the PDM 1016 contains the alarm control port for connection to the PDM's alarm control circuitry.

On the opposite side of the chassis from the power connections, a front panel light emitting diode (LED) 1012 is provided to indicate that one or more of the PSUs in the chassis 1006 are operating. Typically, the power connection plate will be exposed on the rear of the rack, and the opposite side of the chassis having the LED 1012 will be exposed on the front of the rack where the LED 1012 can be viewed by the operator. The LED 1012 is powered from the outputs of the PSUs 1008 and 1010. Multiple LEDs could be used to indicate to the operator which PSUs in the chassis 1006 are in operation, and each LED would be individually powered from its corresponding PSU.

Figure 11A:
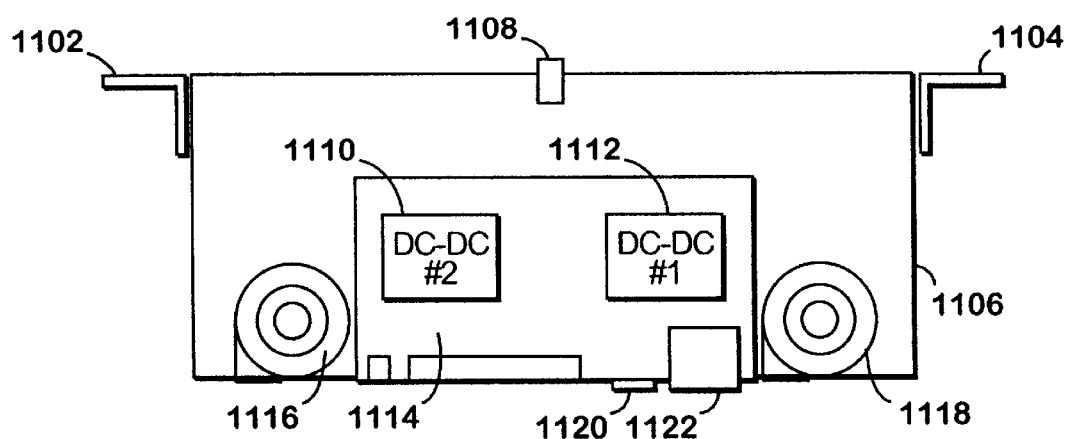
FIG. 11A illustrates a top view of a distributed power supply architecture for a 1U chasses configuration including fans and a power distribution module with integrated converters.

An example of a 1U chassis for a DPA having DC input voltage is shown in FIG. 11A. The chassis 1106 has mounts 1102 and 1104 for securing/unsecuring the chassis to the equipment rack. The chassis 1106 includes a PDM 1114 that contains two DC—DC converter bricks 1110 and 1112 and a PC board (PCB) assembly providing input/output circuit connections for the converters 1110 and 1112. The DC—DC converters 1110 and 1112 can be integrated into the PDM 1114 along with alarm control circuitry because their physical size is relatively small. For high power rated DC—DC bricks, fans 1116 and 1118 are included to circulate air and cool the converters 1110 and 1112 and the chassis 1106 which acts as an additional heatsink. Typically, the fans operate from the converter bricks' output voltages.

The input DC voltage is received at a terminal block 1122. The terminal block 1122 feeds the DC current to a circuit breaker 1120. When the circuit breaker 1120 is in the closed position, the DC current is channeled to the two DC—DC converter bricks 1110 and 1112. The converter bricks 1110 and 1112 convert the input DC voltage to the intermediate DC voltage and supply that voltage to the output jacks of the PDM 1114.

Figure 11B:
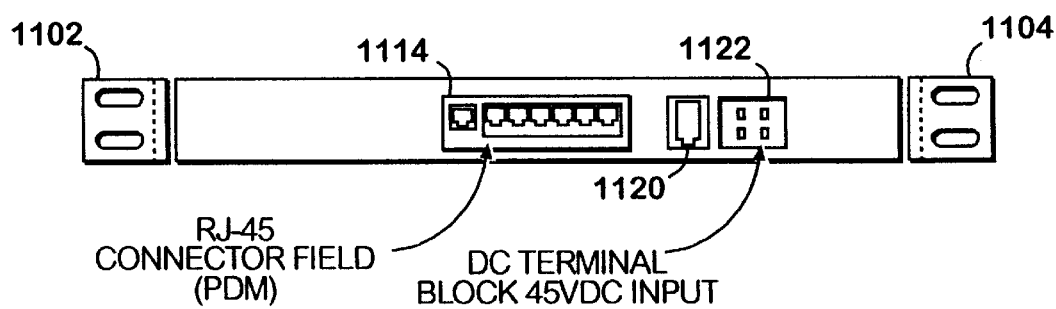
FIG. 11B depicts a front view of the distributed power supply architecture of FIG. 11A.

The front view in FIG. 11B shows the plate of the 1U chassis exposed when mounted in the rack. The mounts 1102 and 1104 remain accessible. The DC terminal block 1122 is exposed thereby enabling simple input voltage connections. The circuit breaker switch 1120 is exposed as well allowing the operator to easily reset the circuit breaker 1120 after it has tripped to stop operation. The circuit breaker 1120 trips when too much input current is being drawn by the DC—DC converters 1110 and 1112. After the operator determines the cause of the excessive current draw and corrects the condition, the circuit breaker 1120 is reset to restore normal operation.

The RJ-45 connector field and alarm control jack of the PDM 1114 are also exposed on the plate of the chassis 1106. Connection between the media converters and the intermediate voltage jacks are easily made while the chassis 1106 is mounted in the rack. The power LED 1108 is provided on the opposite side of the chassis 1106 from the power connections. The LED 1108 indicates that one or more of the converter bricks are operating. The LED is powered by the outputs of the converter bricks 1110 and 1112. Again, multiple LEDs could be used to indicate which converter bricks are operating. Each LED is powered by the output of the corresponding converter brick in that case.

While the invention has been particularly shown and described with reference to preferred embodiments thereof, it will be understood by those skilled in the art that various other changes in the form and details may be made therein without departing from the spirit and scope of the invention.

What is claimed is:

1. An apparatus for distributing electrical power in a media converter system, comprising:
   at least one first converter that converts an input voltage to an intermediate DC voltage;

at least one second converter that converts the intermediate DC voltage to an output DC voltage, the at least one second converter located remotely from the at least one first converter; and at least one electrical conductor electrically linking the at least one first converter to the at least one second converter.

2. The apparatus of claim 1, wherein the input voltage is AC.

3. The apparatus of claim 1, wherein the input voltage is DC.

4. The apparatus of claim 1, wherein the at least one conductor comprises an electrical bus.

5. The apparatus of claim 4, wherein the at least one conductor further comprises at least one RJ-45 patch cable.

6. The apparatus of claim 4, further comprising a plurality of first converters linked to the electrical bus, wherein one or more of the plurality of first converters can be connected or disconnected from the electrical bus without interrupting operation of the apparatus.

7. The apparatus of claim 6, further comprising a plurality of second converters linked to a plurality of patch cables, the plurality of patch cables linked to the electrical bus.

8. The apparatus of claim 1, further comprising at least one media converter device that receives the distributed electrical power and operates on the output voltage.

9. The apparatus of claim 8, wherein the at least one second converter is a component of the at least one media converter device.

10. The apparatus of claim 8, wherein the at least one media converter device receives data signals through at least one data conductor, the at least one data conductor being in proximity to the at least one electrical conductor.

11. The apparatus of claim 1, further comprising a third power converter that converts the output voltage to a second output voltage, the third power converter being electrically linked to the second power converter.

12. The apparatus of claim 1, wherein the at least one electrical conductor comprises at least one resettable fuse.

13. The apparatus of claim 1, wherein the at least one first converter is housed in a first chassis and the at least one second converter is housed in a second chassis.

14. The apparatus of claim 13, wherein the first and second chassis are 1U chassis.

15. A method for distributing power in a media converter system, comprising:

receiving an input voltage into a first converter;

converting the input voltage to an intermediate DC voltage;

transferring the intermediate DC voltage to a remotely located second converter; and converting the intermediate DC voltage to an output voltage.

16. The method of claim 15, wherein the step of transferring the intermediate DC voltage further comprises applying the intermediate DC voltage to an electrical bus.

17. The method of claim 16, wherein the step of transferring the intermediate DC voltage further comprises supplying intermediate DC current from the electrical bus through a patch cable.

18. The method of claim 17, wherein the patch cable is an RJ-45 cord.

19. The method of claim 15, further comprising:

providing the output voltage through a patch cable to a media converter device; and providing data signals through a data cable to the media converter device;

wherein the output voltage is provided through a patch cable and the data signals are provided through a data cable, the patch cable being in proximity to the data cable.

20. The method of claim 16, further comprising electrically connecting one or more additional first converters to the electrical bus without interrupting the output voltage.

21. An apparatus for distributing power in a media converter system, comprising:

at least one first converter that converts an input voltage to an intermediate DC voltage, the at least one first converter having a connector of a first type;

a power connection module having a connector of the first type;

a bus having at least two connectors of a second type, the second type being a mate to the first type;

at least one power cable;

wherein the at least one first converter and the power connection module are connectable to any of the bus connectors not occupied and wherein the at least one power cable is connectable to the power connection module.

22. The apparatus of claim 21, wherein the at least one power cable has a connector of the first type and the power connection module has a connector of the second type that is connected to the power cable's connector.

23. The apparatus of claim 22, wherein the connectors of the first and second type are RJ-45 jacks.

24. A method for distributing power in a media converter system, comprising:

providing at least one first converter that converts an input voltage to an intermediate DC voltage, the at least one first converter having a connector of a first type;

providing a power connection module having a connector of the first type;

providing a bus having connectors of a second type, the second type being a mate to the first type;

providing at least one power cable;

selecting any of the bus connectors not occupied for insertion of the at least one first converter;

selecting any of the bus connections not occupied for insertion of the power connection module; and electrically connecting the at least one power cable to the power connection module.

25. An apparatus for distributing power in a media converter system, comprising:

at least one DC—DC converter having at least one RJ-45 jack for receiving a DC input voltage, the at least one DC—DC converter for converting the DC input voltage to a usable DC voltage; and at least one media converter port in electrical communication with the at least one DC—DC converter, the at least one media converter for receiving the usable DC voltage, for receiving signal transmission in an input media and for utilizing the usable DC voltage to convert the signal transmission to an output media different than the input media.

26. The apparatus of claim 25, wherein the at least one DC—DC converter and the at least one media converter port are embedded within a media converter housing.

27. The apparatus of claim 25, wherein the at least one DC—DC converter is embedded within a first chassis and the at least one media converter port is embedded within a second chassis.

* * * * *